March 10, 1942.    A. BOYNTON    2,275,418
THREADLESS DRILL PIPE
Filed July 17, 1939    2 Sheets-Sheet 1
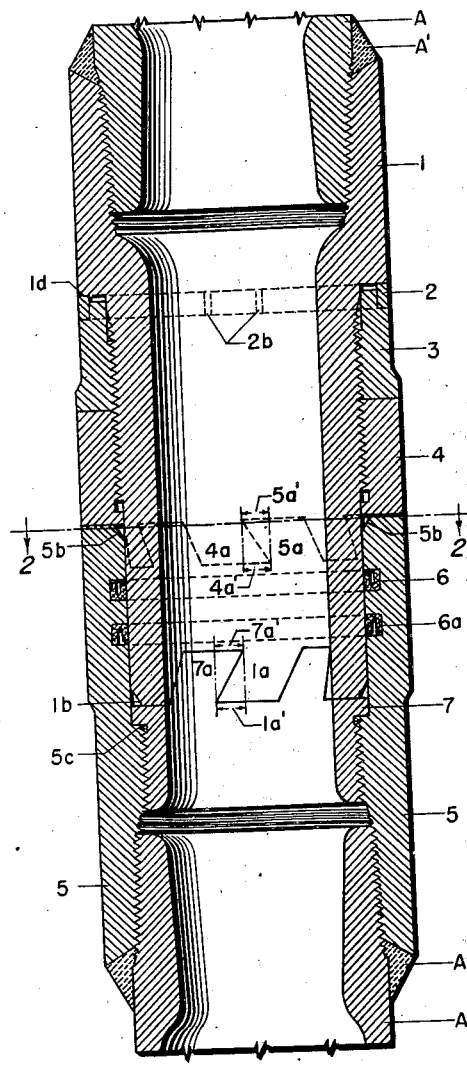
Fig. 1.
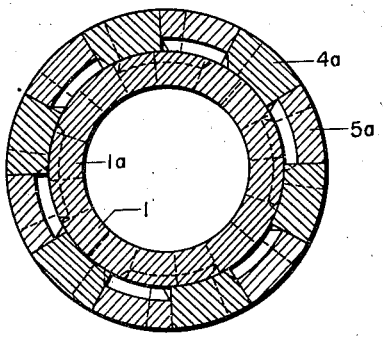
Fig. 2.
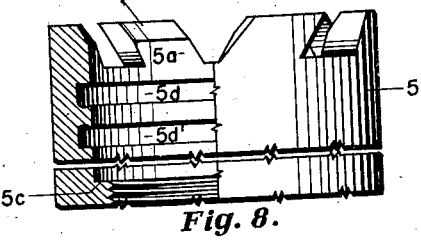
Fig. 3.
Fig. 4.
Fig. 5.
Fig. 6.
Fig. 7.
Fig. 8.
Alexander Boynton, Inventor,
By Jesse R. Stone
Lester B. Clark
Attorneys.

March 10, 1942. A. BOYNTON 2,275,418
THREADLESS DRILL PIPE
Filed July 17, 1939 2 Sheets—Sheet 2

Alexander Boynton, Inventor,
Jesse R. Stone
Lester B. Clark
By
Attorneys.

Patented Mar. 10, 1942

2,275,418

UNITED STATES PATENT OFFICE 2,275,418

THREADLESS DRILL PIPE

Alexander Boynton, San Antonio, Tex.

Application July 17, 1939, Serial No. 284,893

9 Claims. (Cl. 285—146)

My invention relates to drill pipe, and particularly means for connecting the joints thereof together.

The principal object is to provide means enabling the drill pipe to be rotated either right or left without danger of the joints becoming disconnected.

Another object is to provide a connection means enabling joints of drill pipe to be more quickly connected and disconnected than can be accomplished by employing threads.

Another object is to provide a pipe connection means of relatively small diameter and great strength.

These objects are attained by means of interlocking end segments, semi-dovetailed together, and secured against disengagement by the lock nut action of a threaded sleeve which is, in turn, secured by a snap ring or keys, as will more clearly appear from the following specification and the mechanism illustrated in the accompanying drawings, in which—

Fig. 1 is a longitudinal section through the preferred embodiment of the invention.

Fig. 2 is a cross section on the line 2—2, Fig. 1.

Fig. 3 is a side view of the lower portion of the upper coupling member in Fig. 1.

Fig. 4 is an isometric view of the snap ring in Fig. 1.

Fig. 5 is a longitudinal section through the lock ring in Fig. 1.

Fig. 6 is partially an outside view and partially a longitudinal section through the segment sleeve in Fig. 1.

Fig. 7 is an outside view of the base sleeve in Fig. 1.

Fig. 8 is a fragmental outside view and longitudinal section through the lower coupling member in Fig. 1.

Similar characters of reference are employed to designate similar parts throughout the several views.

Figure 9:
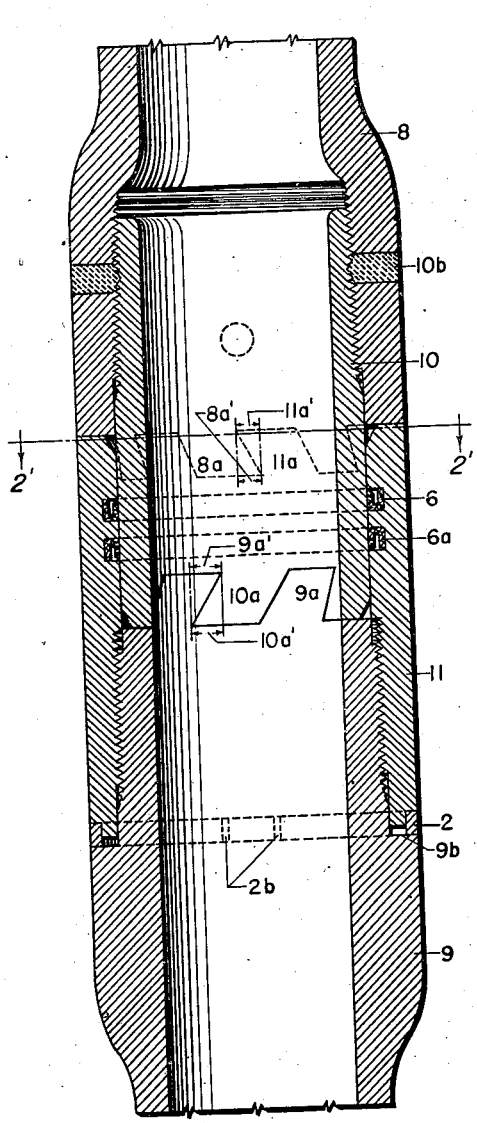
Fig. 9 is a longitudinal section through a modified form of the invention.

The upper coupling member 1 may be fabricated integrally with the lower end of the drill pipe A, or it may be made as a separate part and threadedly joined to the drill pipe A and further secured to it by the weld A', as in Fig. 1. Likewise, the lower coupling member 5 may be formed out of the expanded upset upper end of the lower joint of drill pipe Aa, or it may be separately formed and threadedly joined to the drill pipe Aa and further secured to it by the weld Aa'.

The segment sleeve 4 and the lock ring 3 each have threaded connection over the upper coupling member 1, the snap ring 2 being adapted to engage around this member between the shoulder 1d and the upper end of the lock ring 3.

The base sleeve 7 has its enlarged upper end engaged upon the internal annular shoulder 5c. This sleeve has the upstanding inclined segments 7a (see Fig. 7) between which segments the depending inclined segments 1a of the member 1 are adapted to closely engage.

The member 5 has the upstanding inclined segments 5a, adapted to closely engage with the depending inclined segments 4a of the member 4.

It will be noted that the separate pairs of mating segments incline in opposite directions.

The U cups 6 and 6a, which may be of leather or fabric, are positioned within the annular recesses 5d and 5d', (see Fig. 8), formed within the inner side of the member 5 proximate its upper end which is slidable over the lower portion of the member 1 with which portion of said member 1 the U cups are closely engaged. One cup looks upward and the other cup looks downward in order that each may be expanded by fluid seeking to pass from the direction the cup faces and thus prevent any leakage of fluid into the drill pipe or out of it between the members 5 and 1. Manifestly, these cups may be replaced by any other suitable form of packing.

The snap ring 2 has two bevels of equal pitch. The inner bevel 2b is comparatively short and adapted to be engaged by a special tool for removing it from the assembly. The outer bevel 2a is several times longer than the inner one; thus providing that mud or any other force tending to spread the ring by acting upon the bevel 2b will be more than counterbalanced by the force acting upon the other longer bevel 2a, tending to close the ring.

The throw or incline of the segments 4a and 5a and of the segments 1a and 7a will be assumed to be equal to one-tenth of one complete turn of the member 4. These distances are shown between the vertical dotted lines and the focus point of the nearby acute angles, said throw or incline being designated at 1a', 7a', 4a', and 5a', Fig. 1.

To take the device apart, (it being assumed that the members 5 and 7 are held stationary), remove the snap ring 2 and deposit it about the member 1, proximately above the shoulder 1d and turn the lock ring 3 upward until it engages the shoulder 1d. The members 1 and 4 may be then lifted out of the members 5 and 7. In so doing, the member 1 will be rotated one-tenth of a turn by the engaged sloping surfaces of the segments 1a and 7a. At the same time, the segment sleeve 4 will be rotated upon its threads in the opposite direction by the engaged sloping surfaces of the segments 4a and 5a.

In order to re-assemble the connection, replace the member 1 within the member 5. If, in so doing, the mating segments should land upon each other, a slight rotation of the upper ingoing member having its segments so impinged, will cause the segments to engage as in Fig. 1. Then to complete the assembly, turn the lock ring 3 into engagement with the member 4 and push the snap ring 2 down into place as shown. The bevel 1b upon the lower end of the member 1 and the bevel 5b upon the upper end of the member 5 are for the apparent purpose of facilitating the assembling operation.

The segments 1a and 7a may be slightly longer, such as one-sixteenth inch, than the segments 4a and 5a, in order that any possible impingement in assembling will be between the lower segments only. In this manner, the slight rotation frequently necessary to register the lower segments will also bring the upper segments into registration, unless the segment sleeve 4 was rotated out of the position it assumed when the device was disconnected; or the upper segments 4a and 5a may be slightly longer than the lower segments 1a and 7a, in which event the upper segments will begin to mate before the lower segments will begin mating. If the upper segments should impinge, a slight rotation of the drill pipe A then will cause the lower segments to register and thus produce complete engagement of all the segments, if the ring 4 has not been rotated away from the position it assumed when the connection was taken apart.

The snap ring 2 is precautionary to prevent the lock ring 3 from backing off if its grip upon the member 4 should be loosened by vibration of the drill pipe in operation. Manifestly, this snap ring should have a close fit between the ring 3 and the shoulder 1d, because, as stated, only a slight turn of the member 4 will dis-engage the connection.

It is apparent that the lock ring 3 may be dispensed with and the snap ring alone employed to secure the engagement as shown in Fig. 9.

It is also apparent that the mating segments must have the same pitch and length, but the segments which do not mate may have different pitches and lengths, for convenience in assembling, as stated, or for the purpose of equalizing the strength of the connection formed by each pair of mating segments which pairs, of course, must be oppositely inclined.

In the assembly, it is manifest that independent rotation, clockwise or anti-clockwise, of the parts 1 and 5 will be resisted by the engaged segments. A pulling apart force applied to the members 1 and 5 will, likewise, be resisted by the segments, because the protrusion of the inclined surface of each segment upon the side defined by acute angles is engaged under the corresponding overhanging side of its mating segment, as appears at 1a', 7a', 4a', and 5a'.

While the connection is formed, as in Fig. 1, the base sleeve 7 will not become unscrewed from its connection within the member 5 by any rotary force imparted to it by the member 1, because the member 7 would have to rise to be unscrewed, and it cannot rise, because the member 1, which contacts its upper end, is held down by the engagement between the segments 4a of the sleeve 4 with the segments 5a of the member 5 and the threaded engagement between the members 1 and 4.

The modified form of the invention shown in Fig. 9 illustrates the upper and lower members of the device as fabricated out of the proximate ends of the drill pipe which, thus, is free from any threaded and welded connections, each connection in the drill pipe being assumed to be made as shown.

The principal difference between this modification and the preceding embodiment resides in the omission of the snap ring, moving the U cups from within the male member into the female member, in reversing the position of the outer segment sleeve, and in the construction of the inside base segment sleeve.

The upper drill pipe member 8 has the inclined depending segments 8a adapted to engage between the inclined upstanding segments 11a of the sleeve 11 which has threaded connection over the member 9.

The lower drill pipe member 9 has the inclined upstanding segments 9a adapted to engage with the depending inclined segments 10a of the bushing 10, the latter member having threaded engagement within the member 8 secured by the welds 10b.

The incline or throw of the segments is indicated by the distance between the dotted lines 8a', 11a', 9a' and 10a', and the acute angle point at the corner of the segments.

The separate pairs of segments incline in opposite directions, as appears.

The U cups 6 and 6a, each fitted within a recess interior of the member 11, have a close sliding fit over the bushing 10 which latter member is slidable within the sleeve 11. These cups and the snap ring 2 serve the same purposes as heretofore explained for similar parts in connection with Fig. 1.

The segment sleeve 11 has threaded connection upon the member 9 which has the external annular shoulder 9b adapted to confine the snap ring 2 between it and the end of the sleeve 11.

To take the connection apart, remove the snap ring 2 and, for convenience, deposit it about the member 9 proximately below the shoulder 9b, or about the lower extremity of the member 11. Then raise the member 8, which will rotate slightly while the inclined segments 8a and 11a are becoming disengaged. At the same time, the sleeve 11 will rotate upon its threads slightly in the opposite direction from that of the member 8 to dis-engage the inclined segments 9a and 10a, this rotation moving the sleeve 11 in the direction of the shoulder 9b.

It is assumed that the throw or distance which the segments incline is equal to approximately one-twentieth of a complete turn. The members 8 and 11 each, therefore, will rotate approximately one-twentieth of a turn during the dis-connecting movements.

In re-assembling this construction, it is evident that, if the segments 8a and 11a should impinge endwise upon each other, a slight rotation of either member 8 or 11 will cause these segments to enmesh; whereupon, the sleeve 11 may be rotated slightly if necessary to completely enmesh all the mating segments; whereupon the snap ring 2 may be moved to snap into the position shown in Fig. 9.

Preferably, one set of mating segments should be slightly longer than the other set for convenience in assembling.

It is apparent that the mating segments must be of the same length and pitch, but that the different sets or pairs of segments may be of different lengths and pitches, either or both.

It is also apparent that the enmeshed segments will prevent independent rotation of the members 8 and 9 while assembled as in Fig. 9. Neither can the members 8 and 9 be pulled apart then, because of the overhanging and underthrown relation between the mating segments, unless the members 8 and 9 can rotate independently of each other. The sleeve 11 is the only member rotatable at any time to dis-engage the segments 8a and 11a, but such rotation is prevented by the snap ring 2, closely fitted between the member 11 and the shoulder 9b.

Figure 11:
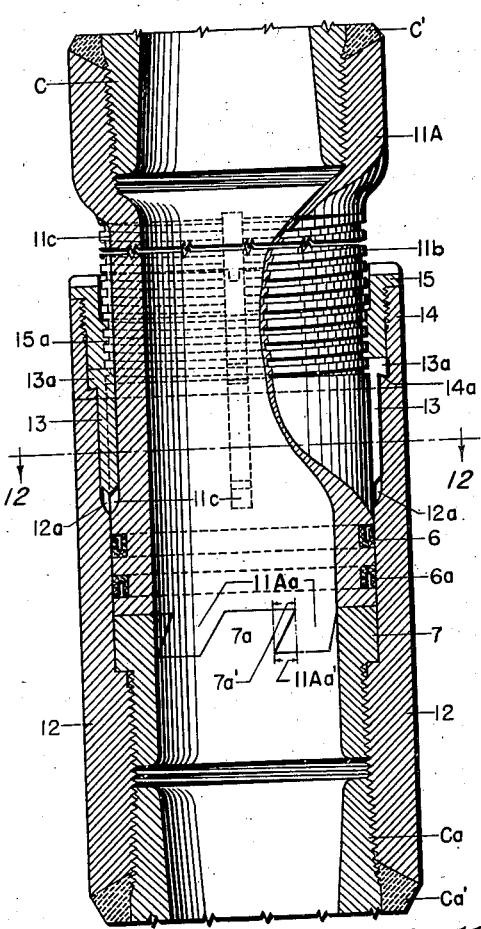
Fig. 11 is a longitudinal section through another modified form of the invention.
Figure 12:
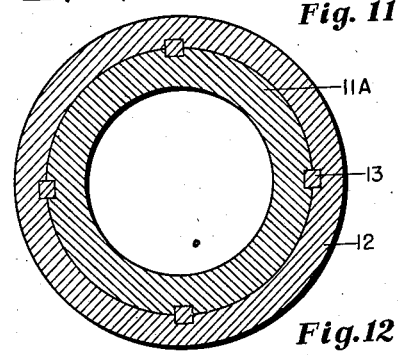
Fig. 12 is a cross section on the line 12—12, Fig. 11.

In Fig. 11, the upper member 11A may be threadedly joined to the drill pipe C and further secured by the weld C'; while the lower coupling member 12 may be threadedly joined to the drill pipe Ca and further secured by the weld Ca'.

The parts 6, 6a, and 7, are the same in construction and purpose as in Fig. 1.

The upstanding inclined segments 7a of the member 7 are adapted to become enmeshed with the depending inclined segments 11Aa of the member 11A, the throw or overlap of these segments being indicated by dotted lines at 7a' and 11Aa', each of these distances being measured from the dotted line to the point of the adjacent acute angle.

Figure 10:
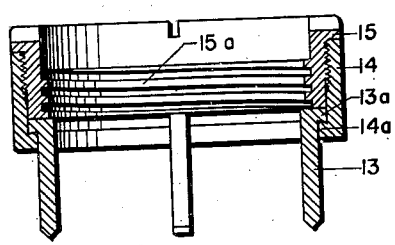
Fig. 10 is a longitudinal section through the locking means assembly in Fig. 11.

The member 11A, having a sliding clearance within the central bore through the member 12, has external threads 11b adapted to engage with the threads 15a within the member 15, (see Fig. 10). The keys 13 are slidable within the oppositely positioned slots 12a of the member 12 and 11c of the member 11A, over which member the internal flange 14a of the member 14 has slight clearance.

The locking means assembly in Fig. 10 has the key carrier 14 with the internal flange 14a, having its upper surface inclined outwardly so as to secure the heads 13a of the keys 13 between this flange and the member 15 which has threaded engagement within the member 14. There is slight clearance between the key heads 13a and the member 15, enabling the members 14 and 15 to be rotated independently of the keys, this clearance being so slight as to prevent the key heads 13a from becoming dis-engaged from the remainder of the assembly at any time while the member 15 is threadedly engaged with the member 14, as in Fig. 10.

The assembly in Fig. 10 cannot be placed as an assembled unit upon the member 11A, because the slots 11c do not extend to the lower end of the member 11A, but must be assembled upon it as follows: (1) Engage the member 15 with the threads 11b and run this member up to the top of the threads. (2) Place the member 14 about the member 11A, and far enough below the member 15 to admit the keys 13. (3) Insert the keys into the slots 12a and 11c from above. (4) Screw the member 15 into the member 14.

To take apart the members 11A and 12, turn the assembled members 14 and 15 upward until the keys 13 are raised above the member 12. In this operation, the keys will travel vertically in their slots, while the key heads 13a will ride around upon the shoulder 14a. The member 11A may then be lifted away from the member 12. In this operation, the member 11A will rotate slightly as indicated at 7a' and 11a' to free the enmeshed segments 7a and 11Aa.

In re-forming the assembly as in Fig. 11, insert the member 11A within the member 12, engaging the segments 7a of the member 7 and 11Aa of the member 11A, and screw the key assembly downward until its member 14 engages upon the member 12.

It is apparent in the forms of this invention as shown in Figs. 1 and 9, that the mechanism is based upon two pairs of semi-dovetailed members, one pair having an independently rotatable member adapted to release the engagement of its segments; thereby releasing the engagement between the other pair of engaged members.

In the modification shown in Fig. 11, one pair of overhanging engaged segments has its engagement secured by removable keys to accomplish the same result as was attained in the other embodiments.

It is understood that the details of construction and arrangement of parts are subject to many obvious variations and minor changes without departing from the scope and purpose of my invention as stated in the objects and as defined by the appended claims.

I claim:

1. A pipe connection of the character described comprising interfitting male and female ends on the connected ends of pipe sections, the end of the male end and the interior of the female end having a plurality of complementary, axially extending, inclined segments adapted to be interengaged by relative axial and rotational movement of the pipe sections, and means threadedly mounted on the male end and threadably moved into engagement with the end of the female end for locking the pipe ends against relative movement after the complementary segments are moved into interengagement.

2. A pipe connection comprising interfitting male and female ends on the connected ends of pipe sections, the end of the male end and the interior of the female end having a plurality of complementary, interengaging, axially extending, inclined segments, registering keyways in the interfitting pipe ends, keys within said keyways, and means threadedly engaging one of said ends and attached to said keys to move the keys to and from locking position within the keyways.

3. A pipe connection of the character described comprising pipe ends having a plurality of complementary, outwardly projecting inclined segments adapted to be interengaged by relative axial and angular movement of the pipe ends, an offset portion on one of said pipe ends having outwardly projecting segments oppositely inclined to the first mentioned segments, a segment sleeve mounted upon the other of said pipe ends and having segments complementary to those on said offset portion, and means for locking said segment sleeve in position after the pairs of segments are in engagement.

4. A pipe connection comprising pipe ends having a plurality of complementary, outwardly projecting, inclined segments engageable by relative axial and angular movement of the pipe ends, an offset portion on one of said pipe ends surrounding the segmented end of the other pipe end and provided with outwardly projecting segments differently inclined than the first mentioned segments, a shoulder on said other pipe end in spaced opposed relation to said offset portion, a threaded area on said other end intermediate such shoulder and the offset portion, a segment sleeve threadedly mounted on said area, said sleeve having segments complementary to and in engagement with the segments on the offset portion, and means interposed between said sleeve and shoulder for locking said segment sleeve in position after the pairs of complementary segments are in engagement.

5. A pipe connection of the character described comprising a female member on one pipe section including inner and outer spaced series of axially extending, inclined segments, a male member on another pipe section adapted to enter the female member, said male member having inclined segments adapted to interfit the inner series of inclined segments in the female member, a sleeve surrounding the male member and having axially extending segments complementary to the outer series of segments on the female member and means for locking said sleeve against movement after the complementary series of segments are in engagement.

6. A pipe connection of the character described comprising pipe ends having a plurality of outwardly projecting, complementary inclined segments adapted to be interengaged by relative axial and angular movement of the pipe ends, an offset portion on one of said pipe ends surrounding the other pipe end and having outwardly projecting segments inclined at a different angle from the angle of inclination of the first mentioned segments, an annular shoulder on said other pipe end in opposed relation to the end of said offset portion, a segment sleeve surrounding the other of said pipe ends, said sleeve having segments complementary to and engageable with the segments on the offset portion, means interposed between said sleeve and shoulder for locking said segment sleeve after the pairs of segments are in engagement, and means intermediate the spaced pairs of interengaged segments forming a seal between the pipe ends.

7. A pipe connection of the character described comprising pipe ends having outwardly projecting, complementary inclined segments adapted to be interengaged by relative axial and angular movement of the pipe ends, an offset portion on one of said pipe ends having outwardly projecting segments inclined at a different angle from the angle of inclination of the first mentioned segments, a segment sleeve surrounding the other of said pipe ends, said sleeve having segments complementary to and engageable with the segments on the offset portion, a shoulder on the other of said pipe ends opposed to said segment sleeve, and a snap ring interposed between said shoulder and sleeve to lock the sleeve after the pairs of segments are in engagement.

8. A pipe connection comprising interfitting male and female ends on the connected ends of pipe sections, the end of the male end and the interior of the female end having a plurality of complementary, interengaging, axially extending, inclined segments, registering keyways in the interfitting pipe ends, keys within said keyways, means threadedly engaging one of said ends and attached to said keys to move the keys to and from locking position within the keyways, and means intermediate the ends of said keys and the segments forming a seal between the concentric pipe ends.

9. A pipe connection comprising interfitting male and female ends on the connected ends of pipe sections, the end of the male end and the interior of the female end having a plurality of complementary axially extending, inclined segments, keyways in said interfitting pipe ends, said keyways being in mating relation when the segments are in engagement, a threaded area on the male pipe end, a plurality of keys having heads thereon, and a key carrier having an internal threaded area for engagement with the threaded area on the male pipe end, there being a sliding connection between the key heads and the key carrier so that the pipe connection may be locked and unlocked by rotational movement of the key carrier about the male pipe end.

ALEXANDER BOYNTON.